(12) United States Patent
Edwards et al.

(10) Patent No.: US 8,689,197 B2
(45) Date of Patent: Apr. 1, 2014

(54) INSTRUCTION CACHE

(75) Inventors: David Alan Edwards, Clifton (GB);
Alan Alexander, Chipping Sodbury (GB)

(73) Assignee: Icera, Inc., Wilmington, DE (US)

( * ) Notice: Subject to any disclaimer, the term of this patent is extended or adjusted under 35 U.S.C. 154(b) by 981 days.

(21) Appl. No.: 12/572,836

(22) Filed: Oct. 2, 2009

(65) Prior Publication Data

US 2010/0088688 A1 Apr. 8, 2010

(30) Foreign Application Priority Data

Oct. 3, 2008 (GB) .................................. 0818165.3

(51) Int. Cl.
*G06F 9/45* (2006.01)

(52) U.S. Cl.
USPC ........... 717/151; 717/140; 717/152; 717/153; 717/156; 717/159; 717/162; 711/125

(58) Field of Classification Search
None
See application file for complete search history.

(56) References Cited

U.S. PATENT DOCUMENTS

| | | | | |
|---|---|---|---|---|
| 5,664,191 A * | 9/1997 | Davidson et al. | ............ | 718/100 |
| 5,796,971 A * | 8/1998 | Emberson | ..................... | 712/207 |
| 5,838,945 A * | 11/1998 | Emberson | ..................... | 712/200 |
| 6,292,934 B1 * | 9/2001 | Davidson et al. | ............ | 717/158 |
| 6,622,300 B1 * | 9/2003 | Krishnaswamy et al. | .... | 717/130 |
| 6,742,179 B2 * | 5/2004 | Megiddo et al. | .............. | 717/130 |
| 6,751,792 B1 * | 6/2004 | Nair | .............................. | 717/161 |
| 6,779,101 B1 * | 8/2004 | Berg et al. | ........................ | 712/24 |
| 6,883,067 B2 * | 4/2005 | Southwell et al. | ............ | 711/118 |
| 6,966,055 B2 * | 11/2005 | Haber et al. | ................... | 717/151 |
| 7,805,708 B2 * | 9/2010 | Jeremiassen | .................... | 717/128 |
| 2002/0147969 A1 * | 10/2002 | Lethin et al. | ................... | 717/138 |
| 2006/0161421 A1 * | 7/2006 | Kissell | ............................. | 703/26 |
| 2006/0206874 A1 * | 9/2006 | Klein | ............................. | 717/136 |
| 2007/0050762 A1 * | 3/2007 | Chen et al. | .................... | 717/169 |
| 2007/0226698 A1 * | 9/2007 | Cascaval et al. | .............. | 717/127 |
| 2009/0055813 A1 * | 2/2009 | Haber et al. | ................... | 717/158 |

FOREIGN PATENT DOCUMENTS

| | | | | |
|---|---|---|---|---|
| JP | 2000056983 | 2/2000 | ............... | G06F 9/45 |
| JP | 2007200240 | 8/2007 | ............... | G06F 9/45 |

OTHER PUBLICATIONS

'Efficient Procedure Mapping Using Cache Line Coloring' by Amir Hashemi et al., ACM SIGPLAN Conference on Programming Language Design and Implementation, Jun. 1997.*
Wikipedia's 'Control Flow Graph' article from Dec. 2007.*
'Achieving High Instruction Cache Performance with an Optimizing Compiler' by Hwu and Chang, copyright 1989 by ACM.*
'Using the Cache Analysis Tool to Improve I-Cache Utilization on C55x Targets' Texas Instruments Application Report by Ning Kang, Dec. 2003.*
'Optimizing for instruction caches' part 1 by Amir Kleen et al., EETimes Design Article, Oct. 29, 2007.*
'Optimizing for instruction caches' part 2 by Amir Kleen et al., EETimes Design Article, Nov. 5, 2007.*
IBM Technical Disclosure Bulletin NN9709125, Sep. 1, 1997.*

(Continued)

*Primary Examiner* — Steven Snyder

(57) ABSTRACT

Disclosed herein is a method of optimizing an executable program to improve instruction cache hit rate when executed on a processor. A method of predicting instruction cache behavior of an executable program is also disclosed. According to further aspects of the present invention, there is provided a software development tool product comprising code which when executed on a computer will perform the method of optimizing an executable program. A linker product and a computer program are also disclosed.

29 Claims, 5 Drawing Sheets

(56) References Cited

OTHER PUBLICATIONS

Wikipedia article 'Disassembler' from Aug. 21, 2008.*
Wikipedia article 'Compiler' from Apr. 14, 2008.*
"Setldorder;" http://www.csn.ul.ie/~caolan/Packages/setldorder.html, Jun. 18, 2007, 1 page.
"The LLVM Compiler Infrastructure;" The LLVM Compiler Infrastructure Project; http://www.llvm.org, Jul. 2008, 3 pages.
"SGI TPL View (CORD);" http://techpubs.sgi.com/library/tpl/cgi-bin/getdoc.cgi?coll=0650&db=man&fname=/u, Nov. 10, 2008, 3 pages.
"IBM—Feedback Directed Program Restructuring (FDPR-PRO);" http://www.haifa.ibm.com/projects/systems/cot/fdpr/, May 4, 2007, 2 pages.
"Advogato;" http://www.advogato.org/article/660.html, May 15, 2003, 3 pages.
"GCC WHOPR;" http://gcc.gnu.org/wiki/whopr?action=print, Jun. 23, 2007, 2 pages.
"RFC: Sort Input Section by List;" http://www.nabble.com/RFC%3A-Sort-input-section-by-list-td19153688.html, Aug. 28, 2008, 15 pages.

* cited by examiner

INSTRUCTION CACHE

CROSS REFERENCE TO RELATED APPLICATION

This Application claims the benefit of GB Patent Application No. 0818165.3 filed on Oct. 3, 2008, entitled "INSTRUCTION CACHE," commonly assigned with the present invention and incorporated herein by reference.

TECHNICAL FIELD

This application is directed, in general, to a method of optimising code to improve instruction cache behaviour, a method of predicting instruction cache behaviour, and computer program products for performing such methods.

BACKGROUND

A processor comprises a memory from which code is fetched for execution, and an instruction cache where a copy of recently fetched code is stored in case that code is needed for execution again soon after. This is temporal locality. In addition, as will be discussed in more detail below, in order to exploit spatial locality then the memory space is divided into regions sometimes referred to as segments, from which code is fetched into correspondingly sized cache-lines in the cache such that code near to a recently used portion of code will also be cached.

The instruction cache is smaller and is coupled directly to the processor's central processing unit (CPU), in contrast with the memory which is larger and must be accessed via a bus (and memory controller in the case of an external memory). Thus the access time involved in retrieving instructions from the cache is less than that involved in fetching the same instructions from memory, and so it is preferable to retrieve instructions from the cache whenever possible.

Of course, since the cache is of a limited size, then all the code of a program of any realistic size cannot be held there simultaneously. Therefore sometimes when new code is fetched from memory and cached, some other code in the cache must be displaced and discarded from the cache in order to make room for the new code.

When fetching an instruction of code, the processor will refer to a caching mechanism. This will then check the cache to see if a copy of the required instruction is already there. If so, the cache can provide the instruction to the processor immediately instead of having to fetch it again from memory. This may be referred to as a cache "hit". If not however, the caching mechanism must fetch the instruction from memory, which will take longer. This may be referred to as a cache "miss".

The efficacy of the caching can be measured in terms of its cache hit rate, i.e., the proportion of times that an instruction is found in the cache when required for execution and so need not be fetched from memory; or conversely the cache miss rate, i.e., the proportion of times that an instruction is not found in the cache when required for execution and so must be fetched from memory. The more efficient the caching, the more time will be saved in accessing instructions for execution.

The caching mechanism on chip is typically fixed, i.e., so that it cannot vary its behaviour for different programs or circumstances to try to improve the cache hit rate. Indeed, typically the caching mechanism is completely hardwired. Nonetheless, some attempts have been made to improve cache hit rate by optimising the code itself during compilation in order to make best use of the caching mechanism.

FIG. 1 is a schematic representation of an instruction cache 6 and a memory 19 storing code to be executed on a processor. FIG. 1 also shows an example mapping between the cache 6 and the memory 19 (although other possible mappings exist). The cache 6 comprises a plurality n of cache lines L=0 to n−1, each being the same number m of instruction words long. The cache lines L are mapped to the memory 19 such that it is divided into a plurality of regions (or segments) R, each region being the same size as a cache line, i.e., m words. Each cache line L is mapped by the processor's caching mechanism to a different respective plurality of non-contiguous regions R. For instance, in the example shown, the n cache lines L=0 . . . n−1 are mapped sequentially in address space to the first n regions of memory respectively, and then sequentially to the next n regions respectively, and so on, with the pattern repeating in the memory's address space throughout the memory 19. So here, the first cache line L=0 is mapped to the memory regions R=0, R=n, R=2n, etc., corresponding to memory address ranges 0 to m−1, nm to (n+1)m−1, 2 nm to (2n+1)m−1, etc. respectively; and the second cache line L=1 is mapped to the memory regions R=1, R=n+1, R=n+2, etc., corresponding to memory address ranges m to 2m−1, (n+1)m to (n+2)m−1, (2n+1)m to (2n+2)m−1, etc. respectively; and so on.

Because each cache line L may be mapped to multiple possible regions R of memory, it cannot of course simultaneously cache code from all the memory addresses to which it may be mapped. Therefore the cache is arranged so that each line L can only be used to cache code from one of its mapped regions R at any given time. The processor maintains a record for each cache line L=0 . . . n−1 with an entry recording the base address ("tag") of the region R of memory to which that line is currently assigned. The processor also maintains in each record a valid flag for each cache line L recording whether that line is valid, i.e. whether the code from the assigned region R has been fetched to that cache line L.

When the processor is to fetch an instruction from an address as specified in its program counter, the caching mechanism consults the relevant record to determine whether that instruction is validly cached, and so whether or not it needs to fetch it from memory 19 or whether it can be retrieved from the cache 6 instead. If the required instruction is located in a different region R than currently mapped to the appropriate cache line L, then there must be a cache miss because the cache line L can only validly cache instructions from one region R at a time. The caching mechanism then reassigns the cache line in question to the new region and fills the cache line with the code from that region, asserting the corresponding valid flag once it has done so. If on the other hand the required instruction is of the same region as currently mapped to a cache line L, then there may either be a cache hit or a cache miss depending on whether the respective valid flag of that line L is asserted. Cache fills are done at the granularity of cache lines in order to exploit spatial locality (and burst accesses to memory).

The program to be executed is stored in the memory 19 and takes up a certain area thereof, typically a contiguous or largely contiguous range of addresses. The program will comprises a plurality of functions arranged in some order in address space. Functions may be stored in regions of memory R potentially mapped to the same cache line L and/or regions mapped to different cache lines. At least some of the functions when executed will call other functions in the program. However, this can cause cache misses, because the program "jumps around" in address space in a manner not coherent with the mapping of cache lines L to memory regions R.

As an illustration of this problem, referring again to FIG. 1, consider for example a program having a function A located in region R=0 and another function B located in region R=n, both of which regions can be mapped to the same cache line L=0. Now, if function A calls function B then there will be a cache miss because the cache line L=0 cannot validly cache the regions of both functions A and B at the same time. Thus the caching mechanism will have to fetch function B from memory 19, and will have to reassign the cache line L=0 to region R=n of memory in place of region R=0: thus in effect function B displaces function A from the cache 6.

Worse, if function B returns to function A, this will cause another cache miss because again the cache line L=0 cannot validly cache the regions of both functions A and B at the same time. The processor will then have to re-fetch function A from memory 19, and the caching mechanism will have reassign the cache line L=0 back to region R=0 in place of region R=1 so that function A displaces function B.

Worse still, if function A calls function B multiple times, the processor will have to repeatedly fetch functions A and B as they repeatedly displace one another back and forth from the cache 6. This phenomenon is sometimes known as "thrashing". It would be desirable to reduce the chance of thrashing in order to avoid unnecessary instruction fetches and thus improve processor speed.

To reduce thrashing or other unnecessary fetches, the goal is therefore to generate the program in such a way that functions like A and B will appear in the same cache line L (in an ideal case), or otherwise to at least try to ensure that they do not occupy different regions R that are mapped to the same cache line L (a more likely case). The probability of both of these goals being achieved can be increased by, for as many functions as possible, arranging the code in address space such that a dependent function (i.e., a descendent or child function) is grouped together into the same region as a function from which it is called (i.e., its parent function), or if that is not possible to at least try to ensure those functions are grouped close by so as not to be located in different regions mapped to the same line (which would result in thrashing). This may not be possible for all functions, and it may not be practical to explicitly consider which functions will be located in which regions; but, generally speaking, the closer that functions are grouped together with their dependent functions then the more likely it is that they will be found within the same region and so be cached into the same cache line when executed, or failing that then the more likely it is that they will not fall within different regions mapped to the same cache line. That is, the more likely it is that related functions will be cached into the same cache-line or at least another non-thrashing cache line.

Note that in some processors, the cache may be an associative cache whereby each different plurality of regions R is mapped to multiple respective cache lines L, usually a small number of cache lines such as two and typically no more than eight. So for example in a two-way associative cache, there are 2n cache lines, such that each plurality of regions comprising a set R, R+n, R+2n, etc. is mapped to two respective cache lines L and L+n. Or in general for a p-way associate cache, there are pn cache lines, such that each plurality of regions comprising a set R, R+n, R+2n, etc. is mapped to p respective cache lines L, L+n, . . . L+p(n−1). Associative caches reduce the chance that code cached from one region of memory needs to be displaced in order to cache code from another region of memory. However, while the associatively p is limited then the above-described problems of cache-misses and thrashing can still occur, and the cache can still benefit from grouping functions with their dependent functions.

Also, note if the fetch unit 5 has a pre-fetch mechanism whereby it automatically pre-fetches code into the next cache line L+1 in advance, then grouping functions together with their dependents may also improve the chance that the required function is cached by the pre-fetch mechanism by the time it is required.

SUMMARY

According to one aspect of the present invention, there is provided a method of optimising an executable program to improve instruction cache hit rate when executed on a processor. In one embodiment, the method includes: receiving a plurality of object files each comprising one or more functions, at least some of said functions in at least one of said object files each comprising one or more function calls to a dependent function in another of said object files; running a linker to link the object files into a first executable file comprising instructions of executable machine code; disassembling instructions of said machine code to determine which of said functions are dependent from calls in which others of said functions; based on the determined dependencies, determining an order of said functions in address space such that functions are grouped together with their dependent functions; and running a linker to re-link the object files into a second executable program with the functions rearranged into said grouped order, such that, when the program is executed on a processor comprising an instruction cache having portions mapped to respective regions of memory in which the program is to be stored, then the chance of a function being cached together with its dependent function is greater than for the first executable file.

According to another aspect of the present invention, there is provided a method of predicting instruction cache behaviour of an executable program. In one embodiment, the method includes: receiving a plurality of object files each comprising one or more functions, at least some of said functions in at least one of said object files each comprising one or more function calls to a dependent function in another of said object files; running a linker to link the object files into a first executable file comprising instructions of executable machine code, the linking comprising arranging the functions into an order in address space; disassembling instructions of said machine code to determine which of said functions are dependent from calls in which others of said functions; and generating a report warning of instruction cache misses to be caused by the executable program when executed on a processor, by using information on both the determined dependencies and the arranged order to predict where functions will not be cached together with their respective dependent functions.

According to further aspects of the present invention, there is provided a software development tool product comprising code which when executed on a computer will perform the above method of optimising an executable program.

According to further aspects of the present invention, there is provided a linker product comprising code which when executed on a computer will perform the above method of optimising an executable program.

According to further aspects of the present invention, there is provided a computer program embodied on a receivable medium which when executed on a computer performs the above method of predicting instruction cache behaviour.

BRIEF DESCRIPTION

For a better understanding of the present invention and to show how it may be carried into effect, reference will now be made by way of example to the accompanying drawings in which.

DETAILED DESCRIPTION

Figure 1:
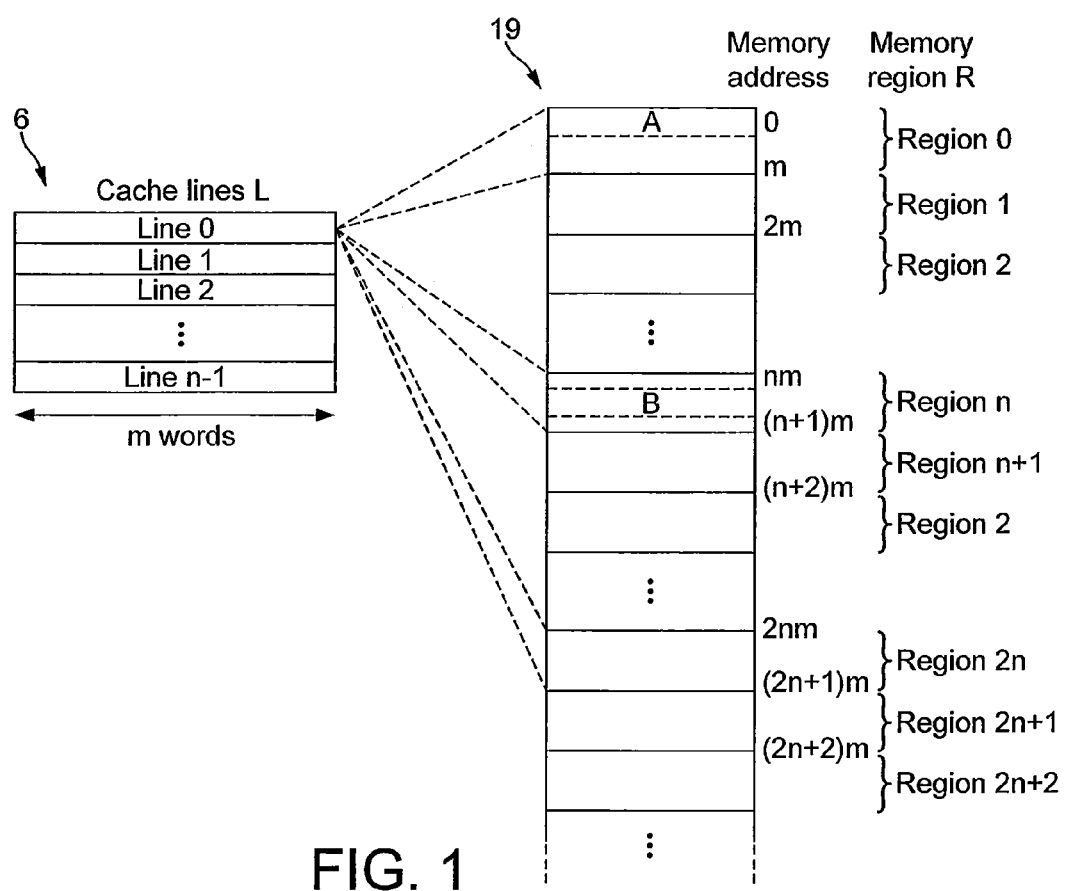
FIG. 1 is a schematic representation of a typical mapping of a cache to a memory.

Embodiments of the present invention disclosed herein are able to perform code optimisation statically but at link time rather than in the compilation by linking the program once then disassembling instructions of that linked program and re-linking. This avoids both the problems of whole-program static optimisation and dynamic optimisation.

In contrast with the provided embodiments of the present invention, a whole-program compiler compiles the program directly from a plurality of modules of source code, instead of compiling the modules individually into object files and then linking them. Thus whole-program compilers are slow, unwieldy and complex, and furthermore require access to the source code which may not be available; whereas an embodiment of the present invention may be relatively much faster and more manageable, and does not require access to the source code—it just requires the object files and any libraries used to link the executable. This also means it can handle hand-written assembly files, unlike whole-program compilers.

At the same time, by disassembling instructions it is still possible to statically analyse the code for cache optimisation, instead of having to perform the analysis dynamically by actually running the linked program and observing its behaviour empirically. Thus employing principles of the invention can allow avoiding the requirement for instrumentation and the associated problem of observational perturbance which are part-and-parcel of dynamic, run-time analysis and optimisation.

In embodiments of the present invention, additional information may be taken into account to further prioritise the ordering of the functions so as to improve the program's caching. Thus an embodiment of a method of the present invention may further comprise determining a respective ordering priority for each of a plurality of said functions, wherein the determination of said order is additionally based on said priorities.

For example, in one embodiment, the determination of said order may comprise: first grouping the highest priority function with its dependent functions, then in turn grouping each next highest priority un-grouped function with any of its yet ungrouped dependent functions. In another embodiment, the determination of said order may comprise: within each group of a function and its dependent functions, arranging the dependent functions in order of their priorities.

The determination of each priority may be based on the number of calls to the respective function by others of said functions. The determination of each priority may be based on a user-assigned priority specified in the respective object file. The determination of each priority may be based on the kind of memory from which the respective function is to be fetched when the program is executed.

The grouping of functions together with their dependent functions may be such that functions are grouped together with their dependent functions and the dependent functions of their dependent functions to a limiting hierarchical level of dependency, and the determination of each priority is based on the hierarchical level of the respective function within its group.

Further, additional information may be taken into account to decide whether or not certain functions should be included at all in the grouping. Thus in one embodiment, a method of the present invention may further comprise determining a respective ordering decision for each function specifying whether or not to group that function, and the determination of said order comprises grouping only those functions whose ordering decision specifies to do so.

For example, the determination of each ordering decision is based on a user-assigned exclusion. E.g., a user could choose to exclude error handling functions, which based on an analysis of their dependencies would appear to be called quite frequently but in practice would (hopefully) be called rarely if at all.

In another example, the determination of each ordering decision is based on the kind of memory from which the respective function is to be fetched when the program is executed. Code from certain types of memory may not be cached at all, e.g. code fetched from an on-chip instruction memory may not be cached whilst only code fetched from an external off-chip memory is cached. In such cases, it may be useful to automatically exclude functions to be stored in un-cached memories from the grouping of dependent functions, since that would have no positive effect on the caching behaviour and their inclusion in the grouping could even displace more worthwhile candidates.

One potential problem of static optimisation from object files at link time is that it may not be straightforward to "see" all the function calls. Thus in embodiments, the present invention may further comprise steps to resolve more indirectly defined function calls.

For example, the determination of said dependencies may comprise parsing symbols in the first executable file to determine the names and addresses of the functions.

The disassembly of instructions may comprise identifying opcodes instructing the processor to jump program counter, identifying the respective operands of those opcodes, and determining the respective dependent functions from the opcodes.

One or more of said operands may comprise a pointer to a memory location, and said disassembly comprises determining an address value to be stored in that location and using that value to determine the respective dependent function. One or more of said operands may comprise a reference to a register, and said disassembly comprises determining an address value to be stored in that register and using that value to determine the respective dependent function. One or more of said operands may be defined by an arithmetic operation, and said disassembly may comprise evaluating the arithmetic operation to determine the respective dependent function.

Said disassembly may comprise identifying a wait instruction instructing the processor to wait for an interrupt, and identifying a corresponding interrupt handler as the respective dependent function. Said disassembly may comprise identifying one of the instructions as a system call to an operating system and identifying one or more corresponding arguments of the system call, the system call being such as to result in a call by the operating system to the respective dependent function so that the function will indirectly call its dependent function via the operating system; and said disassembly may comprise using the system call and arguments to predict the call by the operating system to the respective dependent function.

The system call may comprise a request to switch thread or initiate a thread in a multi-threaded operating system, and the subsequent call by the operating system comprises switching to or initiating a thread comprising the respective dependent function.

In further embodiments, the dependent functions may comprise child function and grand-child functions, and even great-grand-child functions etc. That is, the grouping of functions together with their dependent functions is such that functions are grouped together with their dependent functions and the dependent functions of their dependent functions to a limiting hierarchical level of dependency. The limiting level of a dependent function may be determined by a loop from that function back to a function of a higher hierarchical level of dependency.

In one aspect, principles of the invention may be implemented in a linker. Thus in embodiments, the linking into the first executable file may be performed based on a first linker script, the determination of said order comprises generating a modified linker script specifying said order, and the linking into the second executable file may be performed based on the modified linker script.

Software modems may suffer particularly from high cache miss rates due to its deeply nested protocol stack and large amount of switching between contexts. Therefore in an application employing an embodiment of the present invention, the object files may comprise code of a software modem for processing signals for communication over a wireless cellular communication network.

Figure 2:
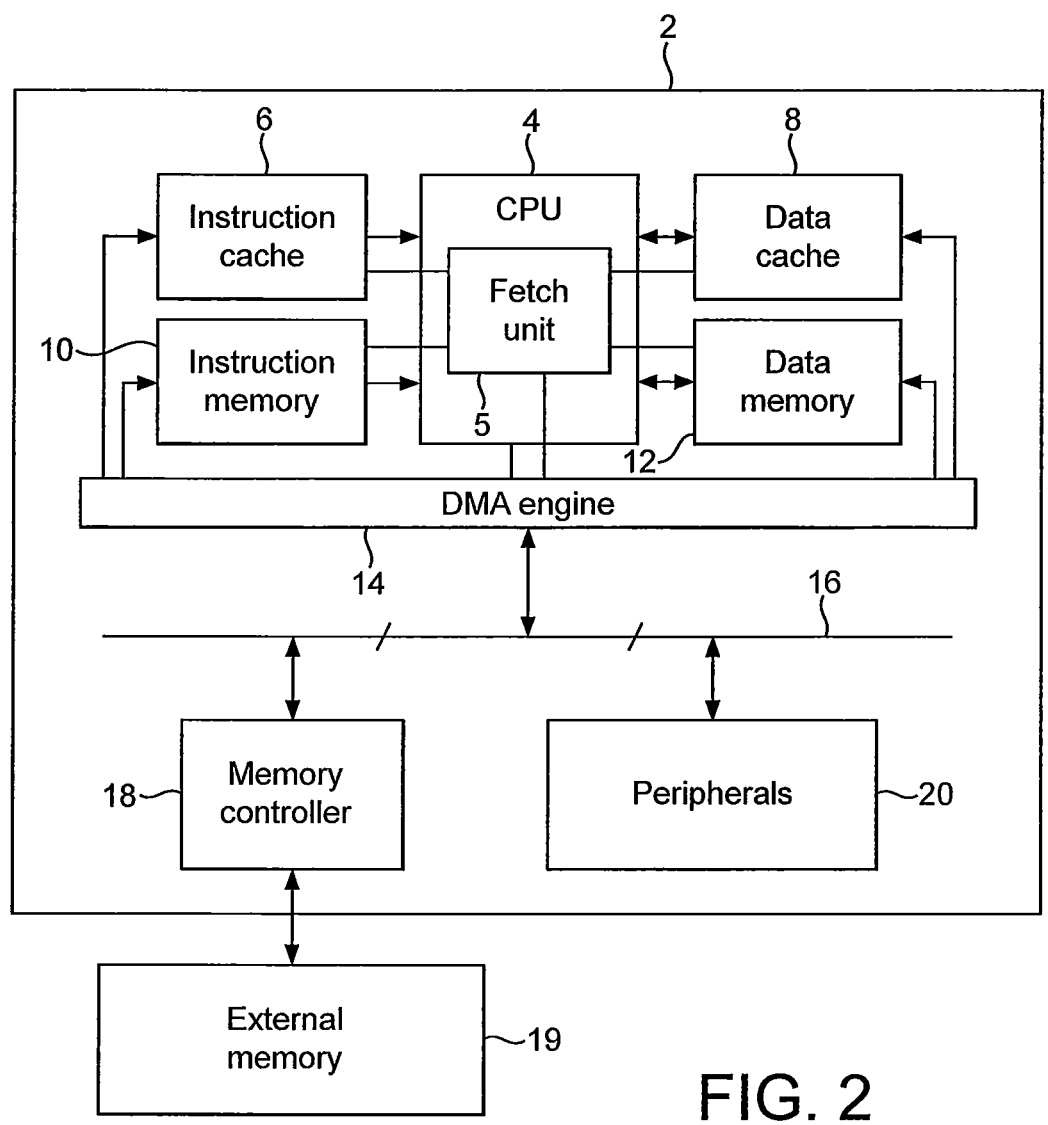
FIG. 2 is a schematic representation of a typical mapping of a cache to a memory.

FIG. 2 is a schematic block diagram of an example target of a program generated according to the present invention. The target comprises a processor chip 2 connected to an external memory 19, i.e. off-chip. The external memory 19 could be for example a flash memory or an SRAM. The processor 2 comprises a CPU 4 having a fetch unit 5, the fetch unit 5 comprising a fetching and caching mechanism. The processor 2 also comprises an instruction cache 6, an instruction memory 10, a data cache 8, a data memory 12 and a direct memory access (DMA) engine 14; all of which are coupled to the CPU 4 including being coupled to the fetch unit 5. In addition, the processor 2 further comprises a system interconnect 16 in the form of a bus or bus network, a memory controller 18 connecting off chip to the external memory 19, and one or more peripherals 20 such as timers or interfaces for connecting to other off-chip devices. Each of the DMA engine 14, memory controller 18 and peripherals 20 is connected to the system interconnect 16 which provides a path therebetween for data and addresses.

By way of example, the program to be executed may be stored in part in the external memory 19 and in part in the on-chip instruction memory 10.

In operation, the CPU 4 executes code by maintaining a program counter ($PC) which specifies the next address from which an instruction is to be fetched for execution, and increments the program counter with each successive instruction. In the case of a function call, the program counter may jump to another value then continue incrementing from there.

Under control of the program counter, the fetch unit 5 will either fetch the required instruction from memory 19 or 10 or if possible retrieve it from the instruction cache 6. In the case of the on-chip instruction memory 10, which is relatively fast and directly coupled to the CPU 4, caching may not be involved and the fetch unit 5 may be configured always to simply fetch the required instruction directly from that on-chip memory 10. However, the external memory 19 has a long access time and must be accessed via the system interconnect 16 and memory controller 18. Therefore in the case of an external memory 19, the fetch unit 5 will be configured to first check the instruction cache 6 to see if the required instruction is available there before resorting to fetching from external memory 19. If so, it retrieves the instruction from the cache 6 (a "hit"), but if not it fetches the instruction from the external memory 19 (a "miss") and caches it. This process has been described in more detail above. Either way, the instruction is then supplied by the fetch unit 4 via the cache 6 to the CPU 4 for execution.

When the fetch unit 5 needs to fetch an instruction from memory external memory 19, it issues a set-up signal to the DMA engine 14 which sets it up to perform a transfer of the instruction from the required address of the external memory 19 to the CPU 4 via the system interconnect 16. The CPU 4 may also set up other transfers between other combinations of components on the system interconnect 16. The details of DMA operation will be familiar to a person skilled in the art.

For completeness, note that the CPU 4 and its fetch unit 5 may also fetch and cache data from the external memory 19 into the data cache 8, or fetch it from on-chip data memory 12, in an analogous manner.

Figure 3:
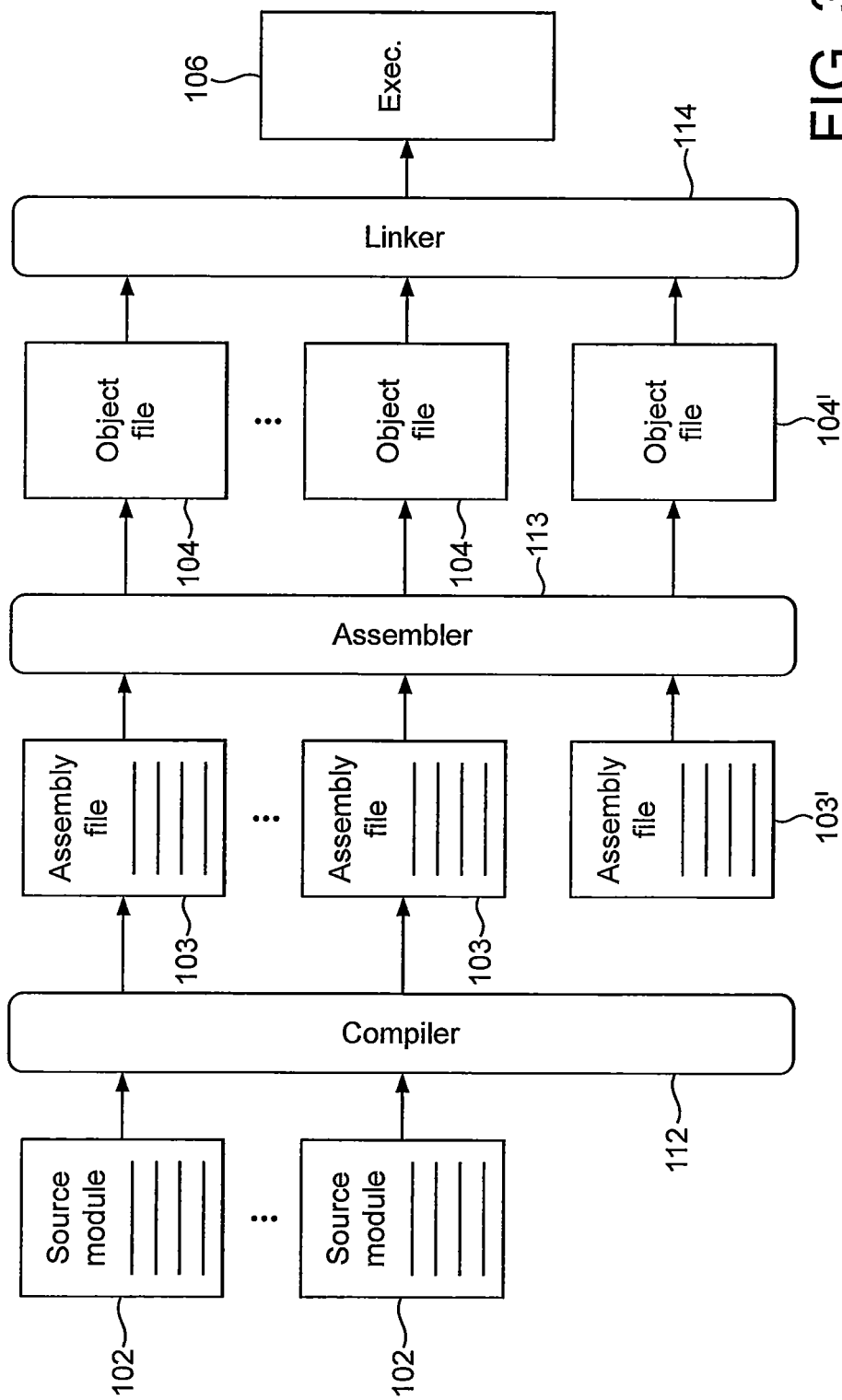
FIG. 3 is a schematic block diagram of a target system.

An overview of the process for compiling, assembling and linking the program to be executed on the processor 2 is now described with reference to FIG. 3. The process begins with a plurality of modules of source code 102, each comprising one or more functions programmed in a high-level language such as C or C++. Each of these source code modules 102 is input to a compiler 112 which compiles each of them individually into a respective assembly file 103 in assembly language. The assembly files 103 are then each input to the assembler 113 which assembles each of them individually into machine code in a respective object file 104. One or more manually written assembly files 103' may also be input to the assembler 113 to generate respective object files 104'. The manual assemble files 103' are written directly into assembly code by a programmer rather than being produced by a compiler. Alternatively or additionally, some or all of the source code modules 102 could be compiled directly to object files 104 comprising machine code, without the assembly language stage.

However, the compiler 112 can only compile each of the source code modules 102 individually, separately from one another: the compiler 112 cannot "see" or take into account information about one source code module 102 when compiling another. This means that where a source module 112 comprises a parent function which calls another, dependent child function in another source code module, then the compiler cannot fully compile that parent function because without information from the other source module then the function call must remain unresolved. In that situation then, the compiler 112 instead emits a directive into the respective assembly file 103 of the parent function. A directive is essentially an instruction to the assembler, in this case an instruction to insert information representing the unresolved function call into the corresponding object file 104. This information may be in the form of a symbol, e.g. a symbol defined in the symbol table of an ELF file (Executable and Linkable Format). Thus the object files 114 comprise the functions of the original respective source modules compiled and assembled into the form of machine code plus symbols representing unresolved function calls.

The object files are then input to a linker 114 which links together the functions of the different object files using the symbols to resolve function calls between object files. The output of this linking is an executable file 106, which can be stored on the memory 19 and executed on the processor 2 in the manner described above.

Note: in contrast, a whole-program compiler such as LLVM or WHOPR would attempt to compile by taking into account information from all source code modules 112 together, but the described process is not concerned with such situations.

As discussed in relation to FIG. 1, to improve the cache hit rate of the program 106 it is preferable to keep functions which call each other close together in address space. This maximises the chance of the functions being in the same instruction cache line L, or at least contiguous in memory so that instruction pre-fetching may result in instructions being cached by the time they are required. It also reduces the chance of the functions being in different regions R of memory mapped to the same cache line L (which are spaced apart), and so reduces the chance of thrashing between dependent functions.

Without any optimisation, the function order will be determined by the lexical ordering of the functions and function entry points as programmed within the source modules 102. The programmer could in principle try to explicitly program the modules 102 in the "ideal" function order. However, this ideal function order is unlikely to be apparent to the programmer. Additionally, the ideal order is not necessarily ideal from the point of view of code simplicity or user readability (e.g. internal functions are typically placed lexically before exported functions), and so "ideal" from the viewpoints of source structure and optimisation are different.

It would therefore be advantageous to provide a better optimisation technique that would allow the source programmer to write the source code in whatever order they found most conducive, and then deal with the optimisation at a later stage.

As mentioned, it would also be advantageous to provide an optimisation technique that would not require recompilation of the source code 102 as do whole-program compilers like LLVM and WHOPR; nor a dynamic, runtime analysis as required by the SGI Cord, IBM FDPR and GNU setldorder.

Figure 4:
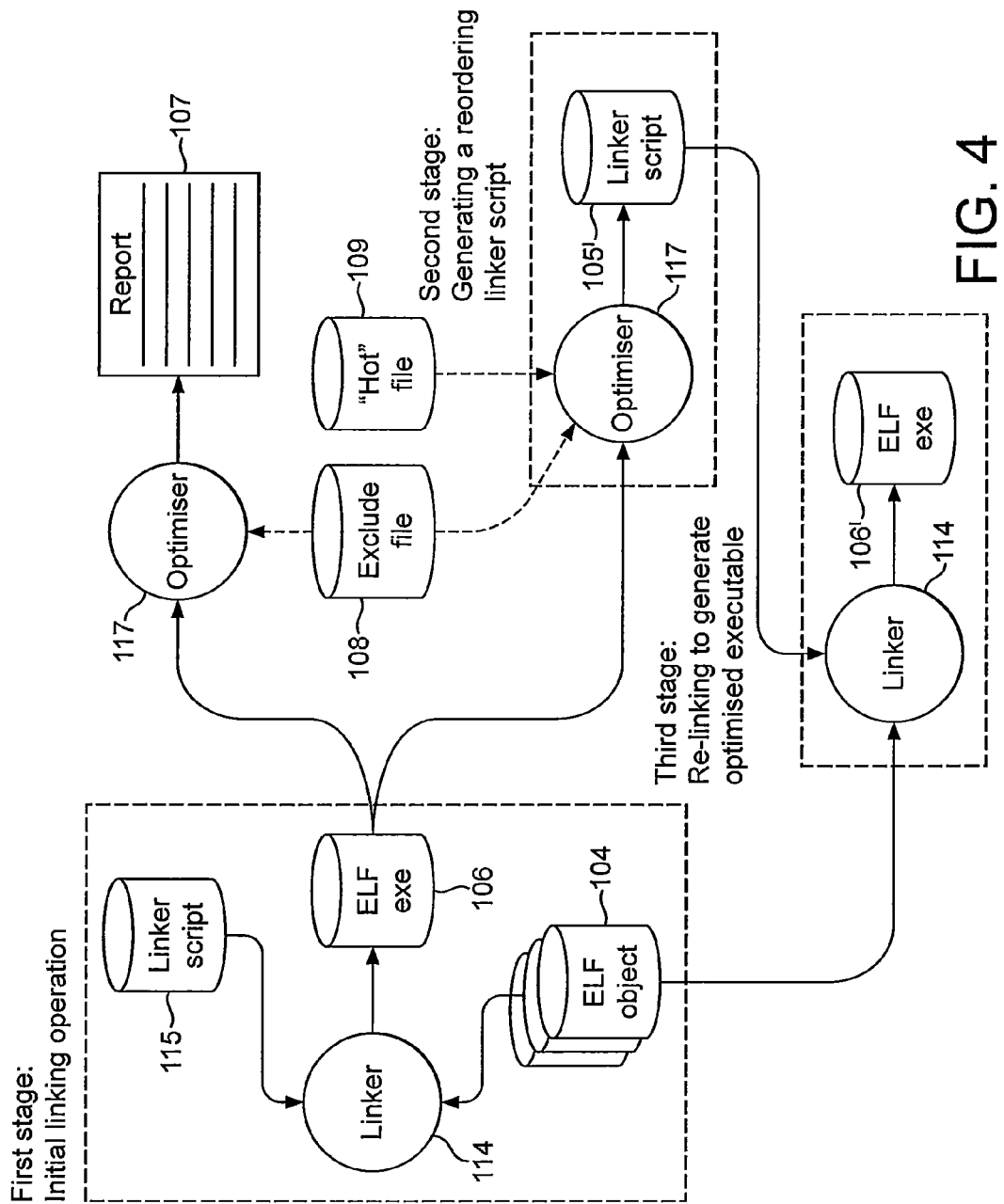
FIG. 4 is a diagram showing cache optimiser flow.

An example of a cache optimisation flow for achieving such aims is discussed in relation to FIG. 4. This begins with a first stage in which a plurality of object files 104 are input to a linker 114 along with a default linker script 105 which provides commands as to how the linker is to operate. Particularly, the linker script 105 describes how sections of the object files should be mapped into the executable 106. In the first stage, under control of the linker script 105, the linker then links together the object files 104 including by using their symbols to resolve function calls between functions of different object files 104, thus generating the executable file 106.

In one embodiment, the object files 104 and executable files could be in the ELF file format (Executable and Linkable Format), a common format for both executable files and linkable object files. This format allows for the possibility of including a symbol table in the final executable file 106, comprising symbol definitions which each indicate the name, location and size of a respective function in the file.

Figure 5:
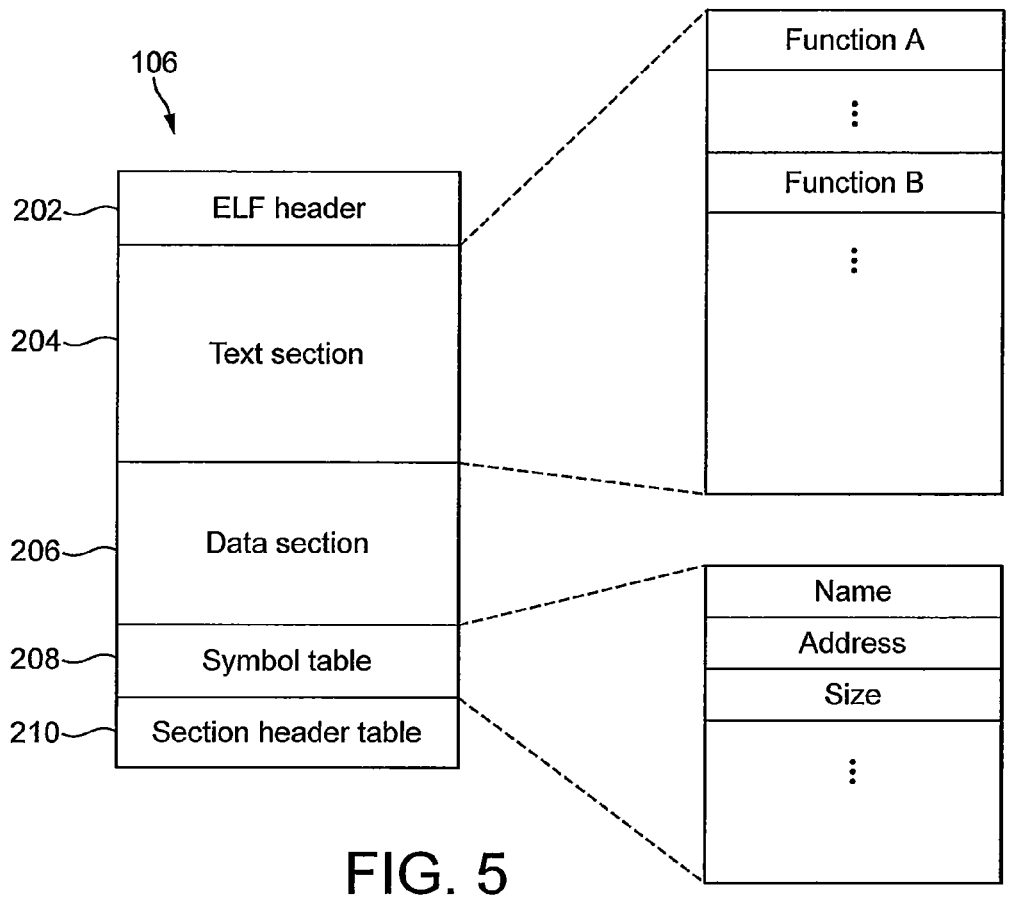
FIG. 5 is a schematic representation of a file format.

A schematic view of an ELF file format is shown in FIG. 5, in this case a view of an executable 106. The ELF file 106 comprises: an overall ELF header 202 comprising information such as the file name and the locations of the various parts within the file; a plurality of sections comprising a "text" section 204, a data section 206 and a symbol table 208 defining a plurality of symbols; and a sector header table 210 identifying the locations of the sectors. As will be familiar to a person skilled in the art, the file may also comprise other parts such as relocation information.

The section known in ELF terminology as the "text" section 204 comprises the compiled, executable machine code of the various functions (not actually text), e.g. including the functions A and B of FIG. 1. The data section 206 comprises any data that those functions might use in their execution. For each symbol definition, the symbol table 208 comprises an entry for the name, size, and start location of the symbol within the file 106. In the case where a symbol comprises a representation of a respective function within the file, these entries comprise the name, size and start location of the function.

The object files 104 may be of a similar format, although where the object file 104 comprises a function that calls a function in another object file 104, then the symbols of that file will additionally include a respective symbol defined in terms of a reference to a function in another object file 104.

In the object files 104, a function of the name functionName may be placed in a section named in the form text.functionName. The default linker scripts use wildcards within the .text section (i.e. .text.*) so that all sections .text.functionName are placed into the .text section.

The ordering applied to these sections by the use of the wildcard .text.* is not well defined, but is typically determined by the order of the object files 104 as seen by the linker, and then in lexical order of functions within each of the object files 104. Thus the default ordering is not optimal.

Therefore, referring again to FIG. 4, at the second stage an optimisation is performed to reorder the functions of the executable 106. In this stage, an optimiser tool 117 takes the executable 106 as an input, and runs an optimiser algorithm which disassembles instructions of the executable file 106 in order to build up a list or "call tree" of function dependencies, i.e. to determine which functions call which other functions. "Disassembling" here does not necessarily mean converting back into any particular assembly language, or reversing any particular assembly operation, but rather more generally can refer to converting machine code back into a higher-level representation or higher level of abstraction. That is, breaking an instruction into its syntactic elements to determine its meaning. By this disassembly, it is possible to determine the functionality of various machine code instructions of the executable file 106 and identify which instructions are function calls, or which will indirectly result in function calls, and determine which other functions they call. This is achieved by identifying any opcodes that might directly or indirectly result in the processor jumping program counter, reading any relevant respective operands or arguments of those opcodes, and using this information to predict the new program counter value. The new program counter value can then be used to match to an address within the address range of a function, which can be found for example from the symbol table 208. Thus the dependent function can be determined.

Note that disassembling an instruction is not the same as executing it. Execution would comprise loading the instruction into a CPU's instruction register and using it to trigger the relevant operation. The disassembly on the other hand is performed by running some other software, in this case the optimiser tool 117, to analyse the instruction in the manner described above.

Once the optimiser 117 has determined the list of dependencies, it determines a new order for the functions so that dependent functions are grouped together more closely to the functions that call them. Based on the determined order, the optimiser then takes the default linker script 105 and modifies it to generate a modified linker script 105' describing a new mapping of the object files' functions to an executable.

At the third stage, the linker 114 then links the same object files 104 but under control of the modified linker script 105', which causes the linker 114 to generate a new version 106' of the executable file in which the functions are re-ordered into the optimised group order. When the new executable file 106' is executed on a processor having a cache, it will thus have a higher chance of a function being cached together with one or more of its dependent functions than the original executable file 106, and therefore a higher cache hit rate.

Note how this optimisation is achieved without needing to have access to the source code modules 102. But at the same time, note how the disassembly of instructions of the executable 106 allows the optimisation to be performed statically, not dynamically at runtime, i.e. without needing to actually execute the original executable file 106. Thus aspects of the invention may allow avoiding the disadvantages both of whole-program compiler static optimisation and of dynamic optimisation.

Either as an alternative to the re-ordering or in addition to it, the optimiser 117 may be used to generate a report 107 for the program developer. This could be achieved by using the described process of disassembling instructions to generate the list of function dependencies for output to the program developer. The developer could then use the reported list 107 to manually modify the linker script 105 to re-order the functions, or to adjust parameters of the optimiser algorithm to improve the re-ordering, or could even be used simply as information.

When the optimiser algorithm groups together functions with their dependent functions, it could apply a grouping priority to the functions. This priority is a kind of weighting factor which indicates the relative importance of placing a function closer to its parent. This priority or weighting factor may be referred to herein as the function's "heat". For example if a parent function A had two dependent functions B and C, and C had a higher heat value than B, then the optimiser algorithm may preferably place the function C immediately adjacent to A with B placed after C, reflecting that it is a higher priority to try to cache C together with A than it is to try to cache B together with A. This heat value could be generated for each function automatically by an "auto-heat" part of the algorithm, or could be specified by the program developer in a "heat file" 109 which is optionally input to the optimiser 117. In the case of an automatically generated heat value, this could for example be determined automatically based on the number of times a function is called by another function, and/or on the hierarchical level of the function in the call tree. In the case of a user-assigned heat value, the developer could decide this based on their own expertise and/or on information provided to them in the report 107.

In another option, the program developer could provide an "exclude file" 108 as an input to the optimiser 117. This exclude file would comprise the names of functions that the developer decided should not be included in the grouping, i.e. functions which the optimiser algorithm should not attempt to group together with functions that call them. This would typically be the case where the static call tree indicated that a function was called by a large number of other functions, but in practice when the program is actually executed that function would be expected to be called only rarely if at all. An example would be an error-trapping function, which is potentially called by a great many other functions in the program and would be shown in the static call tree as being dependent on all of those functions. However, when the program is actually run then the program developer would in fact expect (or at least hope) that the error-trapping function would be called rarely if at all. The developer's decision about exclusion could be based on their own expertise and/or on information provided to them in the report 107.

Details of some cache optimisation techniques according to the principles of the invention are now discussed.

A potential difficulty with the static optimisation is determining as many function call relationships as possible. There are some function calls which cannot be seen from an immediate disassembly, in which case more in-depth techniques are required. The following techniques may still not necessarily see all the function calls (e.g. if they were indirect calls and forming the destination program counter based on data values only obtainable at run time), but this is believed to be a small percentage of typical cases: most function calls are encoded in a manner which the following techniques will be able to decode. A small percentage of missed dependencies is certainly tolerable.

By adding knowledge of the ABI (Application Binary Interface) and/or RTOS (Real-Time Operating system) into the optimiser tool 117, it is possible to determine the relationship between certain instructions and functions which isn't normally statically visible (the ABI describes the low-level interface between a program and the operating system). For example, it is possible to identify system calls to the operating system which in turn invoke other specific functions of the program. Thus it is possible to gain information which isn't directly encoded in the executable file but requires either run-time generated information, or knowledge of the target's ABI and the relationship of such instructions and functions.

It is further possible to determine (by adding knowledge of the target's ABI and RTOS into the optimiser tool) the relationship between instruction sequences used to form arguments to certain important functions and underlying function calls (e.g. calls to functions which will create RTOS threads in a multi-threaded system). Thus again it is possible to gain information which isn't directly encoded in the executable file and would normally require the executable to be modified such that it generated dynamic trace information, and then to execute it and capture the information.

One particular difficulty may be distinguishing possible function calls from actual function calls. Dynamic call information would show which functions call other function(s), and thus implicitly excludes function calls which were not actually made. Static call information attempts to identify all possible function calls, thus it includes some function call dependencies which may never actually occur at runtime, or may occur infrequently. In embodiments, the described technique attempts to ensure that the static call information is weighted to make certain dependencies more important than others (e.g. to mimic the effect of dynamic feedback showing certain dependencies are very common) and to discard potential dependencies which are possible, but wouldn't actually occur. This is done by "weighting" with the "heat" value so that some functions are marked as having relationships more important than others (as dynamic information would provide).

This weighting may involve using the hot file 109 to provide a user-specified list explicitly marking functions the developer knows are statically frequent but dynamically infrequent (e.g. error handling routines). This may involve allowing the auto-heat part of the algorithm to generate a list to explicitly override the order for certain functions. This generates an "auto-heat" for the functions to provide an approximation of how frequently the function and its descendants would be invoked at runtime. This may use a selectable percentage to determine how many of a function's children will be grouped together with it (to ensure the optimiser algorithm doesn't group everything which could be called from a function but dynamically would not be called).

Another potential difficulty is that it is not necessarily possible to reorder all the functions, and if one function is reordered then that will change the cache behavior of all the functions. Thus, a more holistic approach made be employed by considering together as many functions as possible, reducing thrashing by grouping functions which call each other closely together to increase spatial locality. This should increasing the chances of parent and descendant functions being in the same cache line (or same cache way in an associative cache), and reduce cache thrashing by reducing the chances of the parent and descendent functions being in different regions mapped to the same cache line.

Figure 6:
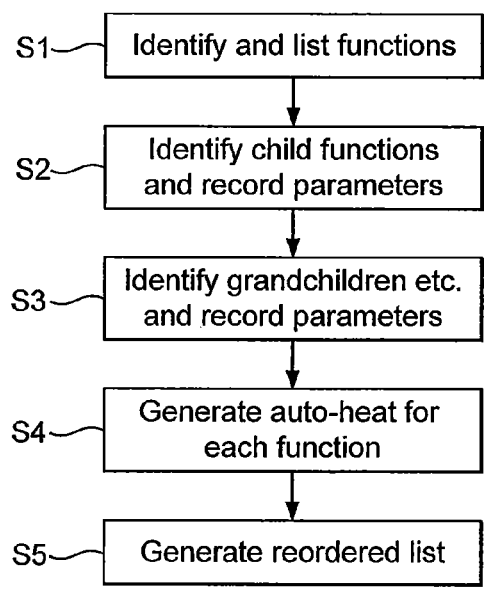
FIG. 6 is a flow chart of a cache optimiser algorithm.

An example of a cache optimiser algorithm is now described with reference to the flow chart of FIG. 6. The first step S1 is to identify the functions from the executable file 106 and create a list of the functions. This may be done by parsing the ELF symbol table 208 to extract the names, start program counter ($PC) and end $PC of each function. The creation of the list may comprise one or more of the following sub-steps for each function.

Record the function's name (from the ELF symbol table name—this will be used to define section .text.functionName used to reorder it).

As a starting point, record that the function has so far been counted to have been called zero times and to have zero descendant functions, which are called zero times. Also record that the function is so far not excluded.

Determine the kind of memory in which the function is to be stored. It may be useful to distinguish areas of the target's memory system with different properties (cacheabiliity, latency etc.). Therefore classify each function by its memory kind (e.g. on-chip instruction memory 10, external cached memory 19, external uncached memory, etc.) using the function's start $PC. The exact kinds of memory will probably be target dependant, but will at least include the concepts of cached and uncached kinds of memory, and potentially memories of different latency. Functions of un-cached memory kinds should be marked as excluded, to prevent the algorithm including them in the grouping of functions with their dependent functions.

Check the function's name is unique against all other functions identified (e.g. the optimiser 117 may rely on a function being placed in a suitably named section .text.functionName, and if not it may not be able to be reordered by using .text.functionName for the section as there may be other such sections). Non-uniquely named functions should be marked as excluded.

Check the function's start $PC and end $PC are unique against the address ranges of all other functions identified (its not it may not be able to be reordered). Non-uniquely addressed functions should be marked as excluded.

The developer can optionally specify a list of functions (by name or $PC range) to exclude, using the exclude file 108. This will allow the developer to prevent the attempted optimisation of function calls which are statically frequent but will be dynamically infrequent (e.g. calls to error handling routines). The optimiser algorithm records from this file 108 whether the function is marked as excluded.

The second step S2 is to identify the child (i.e., dependent) functions and record certain parameters of them, iterating over the list of functions created in step S1. For each non-excluded function, this may comprise one or more of the following sub-steps.

Read the function's "text" section from the executable ELF file 106 according to its specific start $PC and end $PC (e.g. either using ELF file offset information, or using a memory alias containing the ELF file at the target's memory addresses).

Statically interpret the instructions by disassembling them in order to identify calls to other functions in step S1 (i.e. match the $PC address used in function call instruction sequences against functions identified in step S1).

Record details of the child functions called. For each child record:
its memory kind,
the number of times it is called,
the hierarchical level at which the function call occurred (which is 0 for child functions, and will be >0 for further descendant functions we'll identify in the next step), and
whether the disassembly revealed that a function call was made from inside a loop.

Check the child function's memory kind is performance-compatible (e.g. calling uncached code from a cached parent function isn't sensible). If it is not performance-compatible generate a warning.

The exact details of static interpretation by disassembly will be specific to the instruction set architecture (ISA) which the ELF executable is intended to be executed on. However, the principle is not specific to any special properties in the ISA. It is unusual for an ISA to simply encode function calls as single instructions (though they may do). Generally small sequences of instructions are used.

One suitable ISA is MIPS32 (MIPS was originally an acronym for Microprocessor without Interlocked Pipeline Stages).

Example instructions or instruction sequences that can be disassembled for the purposes of the present invention are as follows.

a) Instructions which directly call another function: for example instructions which call an absolute address (or an offset from the current instruction's $PC address) and which save the return address somehow (either in memory, or in a special register). E.g. for MIPS32 this is the JAL (jump and link instruction) where 28-bits of $PC value are directly encoded. It could also include BAL (which uses an 18-bit $PC offset), and conditional variants (BGEZAL, BLTZAL), etc.

b) Instructions which directly branch to another $PC: these work as per instructions which directly call another function, except they do not directly save the return $PC address (e.g. they are actually branch instructions rather than "function call" instructions per se). They are typically used for control flow operations (e.g. loops) but are sometimes be exploited by the compiler for tail-call recursion sequences. Thus all direct branch instructions should have their destination $PC checked. If the $PC is in another function it is effectively a function call. E.g. for MIPS32 this includes: B, BEQ, BEQZ, BGEZ, BGTZ, BLEZ, BLTZ, BNE, BNEZ (which take an immediate 18-bit $PC offset); and J (where 28-bits of $PC value are directly encoded).

c) Instructions which indirectly call other functions. E.g. a branch or call to a $PC address defined by the contents of a register. These can be used for tail-call optimisation sequences, but can also be used for function-pointer calls.

The contents of the register might be generated by simple sequences such as: an instruction sequence to generate a constant address in register $r, and then a branch to register $r. Thus if the algorithm records the register's state at disassembly and subsequent interprets instructions which update the register with constant values then it can determine the value of registers when used in "branch to register" instruction sequences, and hence determine the dependent function.

If the algorithm records that it has not detected a write to the register, or if the value interpreted does not correspond to a function, then it won't be able to identify the dependent function; but for sequences such as a loading of a constant into register $r then branching to register $r, there should be a good success rate.

This facility may be implemented by statically tracking the value of each register in the target processor 2. Instructions which perform easily interpretable modifications (e.g., load constant, add constant) are used to modify the "value" modeled for the register.

E.g., for MIPS32 this involves JALR (jump and link where a register specifies the destination $PC value). If the algorithm tracks simple assignment of constant values to registers (e.g., LUI and LI which are used to form 32-bit constants, 16-bits at a time) then it will have simple values of sequences such as:
LR Rx, <lowerImm16>
LUI Rx, <upperImm16>
JALR Ry, Rx
Where Rx is a register 0 . . . 31 used to hold the dest $PC, and Ry is used to record the return address.

Other indirect function calls which the optimiser algorithm may disassemble could include a branch or call to a $PC address defined by a pointer to a memory location, or by an arithmetic expression. The algorithm may statically track the contents of memory or evaluate arithmetic expressions in order to determine the $PC value and hence identify the dependent function.

d) Instructions which perform system calls. E.g., a system call X where X is specified as an immediate operand, or as value in a register. These are typically used to invoke system calls to an RTOS (or lower-levels of RTOS software). If the optimiser algorithm has information about the target's ABI it can identify what function these system calls correspond to.
E.g. for MIPS32:
syscall with $v0==1 specifies to call print_int, syscall with $v0==9 specifies to call sbrk etc.
Thus it is possible to "hard code" knowledge of such instruction and function call relationships and so determine the function calls which would be made.

e) Instructions which perform wait-for-interrupt. E.g., in MIPS32 this is the "wait" instruction. These wait instructions are used to suspend execution until an interrupt occurs. If the algorithm has information about the target's ABI it can identify what handling functions these interrupts correspond to, and thus identify the dependent function. It is possible to "hard code" knowledge of such instruction and function call relationships and thus determine the function calls which would be made.

f) Instructions which call specified RTOS routines with arguments corresponding to function entry points. E.g., the entry call-back argument to a thread creation function.

By the techniques outlined above, the instructions in the program do not include any direct or indirect calls to these routines as they are called by a complex instruction sequence in the thread creation routines. By checking for function calls to well-known RTOS routines (e.g., thread creation) and understanding which registers and/or stack offset the entryCB would be passed in, the algorithm can determine the function call and mark the function as being called as a thread. That is, knowing the nature of the system call from its argument or arguments, it is possible to predict what other function the operating system will indirectly call.

Another example in a multi-threaded system would be a system call requesting a switch of thread context to another thread may be predicted to invoke a particular function of that other thread, and hence the dependent function can be identified.

The third step S3 is to identify the full function dependencies, i.e. the full call tree, iterating over the list of functions identified in steps S1 and S2. For each non-excluded function, this may comprise one or more of the following sub-steps.

Process the information for each child function identified in Step S2 above, in a recursive manner so that the algorithm considers all the child function's children, and then the children's children, etc.; and such that it considers the hierarchical level of the function call to the descendant (children are level 0, grandchildren are level 1 etc.). If the descendant is marked as excluded it should be ignored. If a loop is detected (i.e. a call back to a parent function), or a call depth greater than a specified amount, e.g. 100, then the recursion should be terminated.

Record details of the descendant functions called, as in step S2, but for all descendants rather than just immediate children. So for each descendent function called, record:
its memory kind
the number of times its called, and
the hierarchical level at which is was called (i.e. the current level of recursion which started at 1).

Also, check each descendent function's memory kind is performance-compatible (e.g. calling external uncached code from a cached parent isn't sensible). If it is not generate a warning.

The fourth step S4 is to generate the "auto-heat" for each function, i.e. the weighting applied to each function in order to prioritise their grouping. The auto-heat is a number used to estimate how important a function is in terms of reordering relative to other functions, such that the algorithm will order the "hottest" function first, with its descendant functions located following it in address space in order of decreasing heat; then move onto the next hottest function which has not yet been reordered, and so on.

This only needs to be done for kinds of memory which are to be optimised for. E.g., begin with only parent functions whose memory kind is an external cached memory such as the external memory 19, and then consider only their descendants which are in external cached memory—there is no need or purpose to reorder uncached functions to improve cache locality. Auto-heat also need not be generated for excluded functions.

A variety of different methods can be used to assign the auto-heat value.

One option is to assign a function's heat in terms of the number of descendent functions it has, taking into account the hierarchical level of each descendent function. For example, calls from level 1 could be assigned a heat value ½ that at level 0, and calls from level 2 could be assigned a value ⅓ of those from level 0, etc. Thus according to this scheme, a function's heat could be calculated as the sum of each of it's descendent functions' heats multiplied by respective factors dependent on the descendents' levels relative to the parent. That is:

(i) begin initially with a function's heat totalHeat set to 0, then (ii) iterating over the descendants, totalHeat +=perDescendantHeat where perDescendantHeat is equal to the heat of the descendent function (when considered itself as a parent) multiplied by a factor dependent on its hierarchical level relative to its parent.

As per Step S3, if the algorithm knows that the function was called from within a loop, it could also chose to increase its auto-heat appropriately to make it more significant. Another potential option is to multiply the heat of each function by a factor dependent on its memory kind: some memories may have a higher latency than others, and so it may be a higher priority to try to cache more code from high-latency memories than from lower-latency memories.

The fifth step S5 is to generate the reordered list of functions. The algorithm selects each of a plurality of parent functions to process in turn, and processes each function by grouping it together with all of its descendent functions in address space, each descendent function being positioned relative to its parent in order of heat. Once a function has been grouped is marked by the algorithm as having been consumed, so it does not attempt to reorder the same function twice.

The optimiser algorithm first considers the list of "manually hot" functions which can be specified by name (or address) in the hot file 109, and process these first. That is, user-assigned "hot" functions have the highest priority heat, over and above automatically assigned heat values. After that, the algorithm then processes the non-excluded and non-consumed in order of auto-heat. The processing consists of: If the function is not excluded and not yet consumed:

Output the function's section name (e.g. text.functionName) and mark the function as consumed.

Sort the function's descendant functions according to auto-heat (so that the hottest function appears first) and process them in order of heat whereby the process consists of:

If the descendant function is not excluded and not yet consumed, outputting the descendant function's section name (e.g. text.functionName) and marking the descendant function as consumed.

So the above has the effect of grouping functions and their descendants in order of auto-heat. This attempts to provide spatial locality between functions between parent and descendant functions.

In one embodiment, the calculated heat could be augmented or re-weighted using information obtained by a conventional dynamically generated feedback mechanism here. Such an embodiment would be akin to using normal dynamic feedback, but would advantageously allows some tweaks, by considering a combination of statically determined heat and dynamically generated function call counts.

In further embodiments, the auto-heat calculation could weight functions known to be thread entry points differently to normal functions.

In addition to the speed savings achieved by a better cache hit rate, there is also a power saving due to the fact that fewer fetches from memory are required. This is particularly so when the memory fetches are from an external memory, because of the power required to drive the chip's external pins. In fact, using the above techniques, whilst the speed improvement may be of the order of about %5, the number of external memory accesses may be more like the order of about %25. This is a surprisingly disproportionate saving in the number of external accesses, relative to the speed improvement.

In one application employing the principles of the present invention, the target processor chip is designed by Icera and sold under the trade name Livanto®. Such a chip has a specialised processor platform described for example in WO2006/117562.

Also in another application, the software to be generated for execution on the target comprises a software modem, or "soft modem", for handling wireless communications with a wireless cellular network. The principle behind software modem is to perform a significant portion of the signal processing and other functions required for the wireless communications in a generic, programmable, reconfigurable processor, rather than in dedicated hardware.

The software modem may be a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in the instruction memory 10, data memory 12 and/or external memory 19, and executed by the CPU 4.

In one implementation, the dedicated hardware in the receive part of the RF interface may comprise a low noise amplifier (LNA), mixers for downconversion of the received RF signals to intermediate frequency (IF) and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the RF interface may comprise a digital to analogue conversion (DAC) stage, mixers for upconversion of the baseband signals to IF and for upconversion from IF to RF, RF and IF filter stages, and a power amplifier (PA). Optionally, some of these stages may be implemented in an external front-end (in which case the RF interface may not necessarily input and output RF signals per se, but is still referred to as an RF interface in the sense that it is configured to communicate up/downconverted or partially processed signals with the RF front-end for the ultimate purpose of RF communications). The RF interface may comprise an analogue RF interface and/or a digital radio interface such as a DigRF interface. Details of the required hardware for performing such radio functions will be known to a person skilled in the art.

Part of the RF interface may be implemented in one of the peripherals 20, and part of the RF interface may be implemented in an external front-end (not shown) accessed via the RF interface peripheral 20. Received data is passed from the RF interface peripheral 20 to the CPU 4 for signal processing, via the system interconnect 16, data transfer engine 14 and data memory 12 or data cache 8. Data to be transmitted is passed from the CPU 4 to the RF interface peripheral 20 via the data memory 12 or data cache 8, DMA engine 14 and system interconnect 16.

The software executed on the CPU 4 may then handle functions such as: modulation and demodulation, interleaving and de-interleaving, rate matching and de-matching, channel estimation, equalisation, rake processing, bit log-likelihood ratio (LLR) calculation, transmit diversity processing, receive diversity processing, Multiple-Input Multiple-Output (MIMO) processing, voice codecs, link adaptation by power control or adaptive modulation and coding, and/or cell measurements.

As mentioned, it has been observed that a software modem can suffer particularly from a high cache miss rates due to its deeply nested protocol stack and large amount of switching between contexts. Thus principles of the present invention may be advantageously employed in software modems.

As also mentioned, a disproportionate amount of power saving, relative to the speed improvement, may be associated with the invention. This has provided motivation to apply principles of the invention to power-critical applications such as a software modem for use on a mobile terminal.

It will be appreciated that the above embodiments are described only by way of example. For instance, the present invention could be applied to optimise programs other than a software modem: in general, the invention can be applied to optimise the caching behaviour of any type of program. Further, the present invention can be used to optimise programs intended for any target processor. The principles of disassembly described herein can be applied to any instruction set, and are not limited to MIPS. Further, the terms "function" and "function call" are not intended to be interpreted as in any one particular programming language, but in general a function can refer to any program procedure and a function call can refer to any code invoking such a procedure. Similarly, the term "symbol" does necessarily not refer to a feature of any particular file format: in the context of an executable file, a symbol can be any information for identifying and locating a function within the file; and in the context of a linkable object file, a symbol can be any information relating to an unresolved function call to a function of another object. Any file format can be used, and the present invention is not limited to ELF. The principles of the invention can apply to any programming language, any format of object file, any linker and any target in any combination. Further, the term "dependent function" or similar means simply a function that is called by another function: it does not necessarily imply that there is any particular information that must be provided or operation that must be completed by the function (except the call itself) in order for its dependent function to operate (although for any given function that may well often be the case). Equivalent terminology for a function and its dependent function could be: a calling function and a callee function, a parent function and a child function, or a function and its descendent function. Other applications and configurations may be apparent to the person skilled in the art given the disclosure herein.

Those skilled in the art to which this application relates will appreciate that other and further additions, deletions, substitutions and modifications may be made to the described embodiments. The scope of the invention is not limited by the described embodiments, but only by the following claims.

What is claimed is:

1. A method of optimising an executable program to improve instruction cache hit rate when executed on a processor, the method comprising:
   receiving a plurality of object files each comprising one or more functions, at least some of said functions in at least one of said object files each comprising one or more function calls to a dependent function in another of said object files;
   supplying said object files to a linker;
   generating a first executable file comprising instructions of executable machine code by running the linker a first time to link the object files;
   disassembling instructions of said machine code of said first executable file to determine which of said functions are dependent from calls in which others of said functions;
   based on the determined dependencies, determining an order of said functions in address space such that functions are grouped together with their dependent functions; and
   generating a second executable program by running the linker a second time to re-link the object file, wherein the second executable program has the functions rearranged into said grouped order, such that, when the program is executed on a processor comprising an instruction cache having portions mapped to respective regions of memory in which the program is to be stored, then the chance of a function being cached together with its dependent function is greater than if the first executable file were to be executed on that processor.

2. The method of claim 1, further comprising determining a respective ordering priority for each of a plurality of said functions, wherein the determination of said order is additionally based on said priorities.

3. The method of claim 2, wherein the determination of said order comprises: first grouping the highest priority function with its dependent functions, then in turn grouping each next highest priority un-grouped function with any of its yet ungrouped dependent functions.

4. The method of claim 1, wherein the determination of said order comprises: within each group of a function and its dependent functions, arranging the dependent functions in order of their priorities.

5. The method of claim 2, wherein the determination of said order comprises: within each group of a function and its dependent functions, arranging the dependent functions in order of their priorities.

6. The method of claim 2, wherein the determination of each priority is based on the number of calls to the respective function by others of said functions.

7. The method of claim 2, wherein the determination of each priority is based on a user-assigned priority specified in the respective object file.

8. The method of claim 2, wherein the determination of each priority is based on the kind of memory from which the respective function is to be fetched when the program is executed.

9. The method of claims 2, wherein the grouping of functions together with their dependent functions is such that functions are grouped together with their dependent functions and the dependent functions of their dependent functions to a limiting hierarchical level of dependency, and the determination of each priority is based on the hierarchical level of the respective function within its group.

10. The method of claim 1, comprising determining a respective ordering decision for each function specifying whether or not to group that function, and the determination of said order comprises grouping only those functions whose ordering decision specifies to do so.

11. The method of claim 10, wherein the determination of each ordering decision is based on a user-assigned exclusion.

12. The method of claim 10, wherein the determination of each ordering decision is based on the kind of memory from which the respective function is to be fetched when the program is executed.

13. The method of claim 11, wherein the determination of each ordering decision is based on the kind of memory from which the respective function is to be fetched when the program is executed.

14. The method of claim 1, wherein the determination of said dependencies comprises parsing symbols in the first executable file to determine the names and addresses of the functions.

15. The method of claim 1, wherein the disassembly of instructions comprises identifying opcodes instructing the processor to jump program counter, identifying the respective operands of those opcodes, and determining the respective dependent functions from the opcodes.

16. The method of claim 15, wherein one or more of said operands comprises a pointer to a memory location, and said disassembly comprises determining an address value to be stored in that location and using that value to determine the respective dependent function.

17. The method of claim 15, wherein one or more of said operands comprises a reference to a register, and said disassembly comprises determining an address value to be stored in that register and using that value to determine the respective dependent function.

18. The method of claim 16, wherein one or more of said operands comprises a reference to a register, and said disassembly comprises determining an address value to be stored in that register and using that value to determine the respective dependent function.

19. The method of claim 15, wherein one or more of said operands is defined by an arithmetic operation, and said disassembly comprises evaluating the arithmetic operation to determine the respective dependent function.

20. The method of claim 16, wherein one or more of said operands is defined by an arithmetic operation, and said disassembly comprises evaluating the arithmetic operation to determine the respective dependent function.

21. The method of claim 1, wherein said disassembly comprises identifying a wait instruction instructing the processor to wait for an interrupt, and identifying a corresponding interrupt handler as the respective dependent function.

22. The method of claim 1, wherein said disassembly comprises identifying one of the instructions as a system call to an operating system and identifying one or more corresponding arguments of the system call, the system call being such as to result in a call by the operating system to the respective dependent function so that the function will indirectly call its dependent function via the operating system; and said disassembly comprises using the system call and arguments to predict the call by the operating system to the respective dependent function.

23. The method of claim 22, wherein the system call comprises a request to switch thread or initiate a thread in a multi-threaded operating system, and the subsequent call by the operating system comprises switching to or initiating a thread comprising the respective dependent function.

24. The method of claim 1, wherein the grouping of functions together with their dependent functions is such that functions are grouped together with their dependent functions and the dependent functions of their dependent functions to a limiting hierarchical level of dependency.

25. The method of claim 24, wherein the limiting level of a dependent function is determined by a loop from that function back to a function of a higher hierarchical level of dependency.

26. The method of claim 1, wherein the linking into the first executable file is performed based on a first linker script, the determination of said order comprises generating a modified linker script specifying said order, and the linking into the second executable file is performed based on the modified linker script.

27. The method of claim 1, wherein the object files comprise code of a software modem for processing signals for communication over a wireless cellular communication network.

28. A software development tool product comprising code which when executed on a computer will perform a method of optimising an executable program comprising:

receiving a plurality of object files each comprising one or more functions, at least some of said functions in at least one of said object files each comprising one or more function calls to a dependent function in another of said object files;

supplying the object files to a linker;

generating into a first executable file comprising instructions of executable machine code by running the linker a first time to link the object files;

disassembling instructions of said machine code of said first executable file to determine which of said functions are dependent from calls in which others of said functions;

based on the determined dependencies, determining an order of said functions in address space such that functions are grouped together with their dependent functions; and generating a second executable program by running the linker a second time to re-link the object files, wherein the second executable program has the functions rearranged into said grouped order, such that, when the program is executed on a processor comprising an instruction cache having portions mapped to respective regions of memory in which the program is to be stored, then the chance of a function being cached together with its dependent function is greater than if the first executable file were to be executed on that processor.

29. A linker product comprising code stored on a non-transitory computer readable medium which when executed on a computer will perform a method of optimising an executable program comprising:

receiving a plurality of object files each comprising one or more functions, at least some of said functions in at least one of said object files each comprising one or more function calls to a dependent function in another of said object files;

supplying the object files to the linker;

generating a first executable file comprising instructions of executable machine code by running the linker a first time to link the object files;

disassembling instructions of said machine code of said first executable file to determine which of said functions are dependent from calls in which others of said functions;

based on the determined dependencies, determining an order of said functions in address space such that functions are grouped together with their dependent functions; and generating a second executable program by running the linker a second time to re-link the object files, wherein the second executable program has the functions rearranged into said grouped order, such that, when the program is executed on a processor comprising an instruction cache having portions mapped to respective regions of memory in which the program is to be stored, then the chance of a function being cached together with its dependent function is greater than if the first executable file were to be executed on that processor.

* * * * *